US011600153B1

(12) United States Patent
Okezie

(10) Patent No.: US 11,600,153 B1
(45) Date of Patent: Mar. 7, 2023

(54) APPARATUS AND METHOD TO REDUCE TRAFFIC ACCIDENTS

(71) Applicant: Pathfins C. Okezie, Piscataway, NJ (US)

(72) Inventor: Pathfins C. Okezie, Piscataway, NJ (US)

( * ) Notice: Subject to any disclaimer, the term of this patent is extended or adjusted under 35 U.S.C. 154(b) by 0 days.

(21) Appl. No.: 17/898,166

(22) Filed: Aug. 29, 2022

(51) Int. Cl.
| | | |
|---|---|---|
| *G08B 3/10* | (2006.01) | |
| *H04R 3/00* | (2006.01) | |
| *G06F 3/16* | (2006.01) | |
| *H04R 1/02* | (2006.01) | |

(52) U.S. Cl.
CPC ............ *G08B 3/10* (2013.01); *G06F 3/165* (2013.01); *H04R 1/028* (2013.01); *H04R 3/00* (2013.01); *H04R 2420/07* (2013.01)

(58) Field of Classification Search
CPC ........... G08B 3/10; G06F 3/165; H04R 1/028; H04R 3/00; H04R 2420/07; G07C 2009/00968; G07C 2009/64; G07C 9/00563; G07C 9/00658; G08C 17/02; G08C 2201/20; G08C 2201/32; G08C 2201/91; G08C 2201/93; H04Q 9/00
See application file for complete search history.

(56) References Cited

U.S. PATENT DOCUMENTS

| | | | |
|---|---|---|---|
| 7,880,601 B2 | 2/2011 | Okezie | |
| 10,347,107 B1 | 7/2019 | Okezie | |
| 11,130,502 B2 * | 9/2021 | Reschke | G06V 40/193 |
| 11,257,348 B1 * | 2/2022 | Hughes | G08B 3/10 |
| 2015/0277559 A1 * | 10/2015 | Vescovi | G06F 3/017 |
| | | | 345/173 |
| 2015/0332532 A1 * | 11/2015 | Lee | G07C 9/00658 |
| | | | 340/5.72 |
| 2017/0082649 A1 * | 3/2017 | Tu | G01P 13/00 |
| 2020/0168014 A1 * | 5/2020 | Uliyar | G06V 20/46 |
| 2021/0006918 A1 * | 1/2021 | Munoz | H04S 3/02 |
| 2021/0101483 A1 | 4/2021 | Okezie | |
| 2022/0069625 A1 * | 3/2022 | Puskarich | H02J 50/10 |
| 2022/0164026 A1 * | 5/2022 | Sicconi | G08B 5/223 |

* cited by examiner

*Primary Examiner* — Orlando Bousono
(74) *Attorney, Agent, or Firm* — Walter J. Tencza, Jr.

(57) ABSTRACT

A wrist band including a computer processor; a computer memory; an audio speaker in communication with the computer processor of the wrist band; and a wireless transmitter/receiver in communication with the computer processor of the wrist band; and a dashboard apparatus on a vehicle. The computer memory of the wrist band having computer programming for causing the computer processor of the wrist band to play an audio message when instructed to by the dashboard apparatus. The dashboard apparatus having a computer processor; a computer memory; an audio speaker in communication with the computer processor of the dashboard apparatus; and a wireless transmitter/receiver in communication with the computer processor of the dashboard apparatus. The computer memory of the dashboard apparatus includes computer programming for causing the dashboard apparatus to cause an audio message to be played when the wrist band is within a predetermined range of the dashboard apparatus.

14 Claims, 2 Drawing Sheets

APPARATUS AND METHOD TO REDUCE TRAFFIC ACCIDENTS

FIELD OF THE INVENTION

This invention relates to apparatuses and methods regarding hit and run vehicular traffic accidents.

BACKGROUND OF THE INVENTION

Hit and run motor vehicle accidents are one of the challenges facing law enforcement for a long time. Worse of all there is no technology currently in the market to try to solve this common problem.

There are about 682,000 hit and run accidents each year in the United States. Only a small percentage of the operators of the hit and run vehicles are caught and the majority of these hit and run vehicle operators are still driving daily on our roads and highways without any punishments for their crimes. These hit and run operators may commit further hit and run motor vehicle accidents again in the future and may try to go undetected again. The victims of these hit and run accidents may die from their injuries, may be maimed or be on disability for life without the opportunity to work and provide for their families. One of the excuses vehicle operators give as causes of hit and run accidents is that they did not see the pedestrian, cyclist or motorcyclist.

In addition, sometimes an individual, intentionally may use a vehicle as weapon by driving the vehicle into a crowd, in attempts to hurt or kill a number of people. There is a need to limit the effects of such nefarious acts.

SUMMARY OF THE INVENTION

In at least one embodiment, the present invention provides technology which includes a wrist band that is worn on either the left or the right wrist of for example, a pedestrian, cyclist, or motorcyclist.

In at least one embodiment, an apparatus is provided comprising: a wrist band comprising: a computer processor; a computer memory; an audio speaker in communication with the computer processor of the wrist band; and a wireless transmitter/receiver in communication with the computer processor of the wrist band.

The computer memory of the wrist band may include computer programming for causing the computer processor of the wrist band to cause an audio message to be played by the audio speaker of the wrist band when instructed to by a signal from a dashboard apparatus located on a vehicle.

The apparatus may further include a dashboard apparatus; wherein the dashboard apparatus is comprised of: a computer processor a computer memory; an audio speaker in communication with the computer processor of the dashboard apparatus; and a wireless transmitter/receiver in communication with the computer processor of the dashboard apparatus; and wherein the computer memory of the dashboard apparatus includes computer programming for causing the computer processor of the dashboard apparatus to cause an audio message to be played by the audio speaker of the dashboard apparatus when the wrist band is within a predetermined range of the dashboard apparatus.

In at least one embodiment, a method is provided which may include placing a dashboard apparatus on a dashboard of a vehicle; wherein the dashboard apparatus is comprised of: a computer processor; a computer memory; an audio speaker in communication with the computer processor of the dashboard apparatus; and a wireless transmitter/receiver in communication with the computer processor of the dashboard apparatus.

The computer memory of the dashboard apparatus may include computer programming for causing the computer processor of the dashboard apparatus to cause an audio message to be played by the audio speaker of the dashboard apparatus when a wrist band is within a predetermined range of the dashboard apparatus.

DETAILED DESCRIPTION OF THE DRAWINGS

Figure 1:
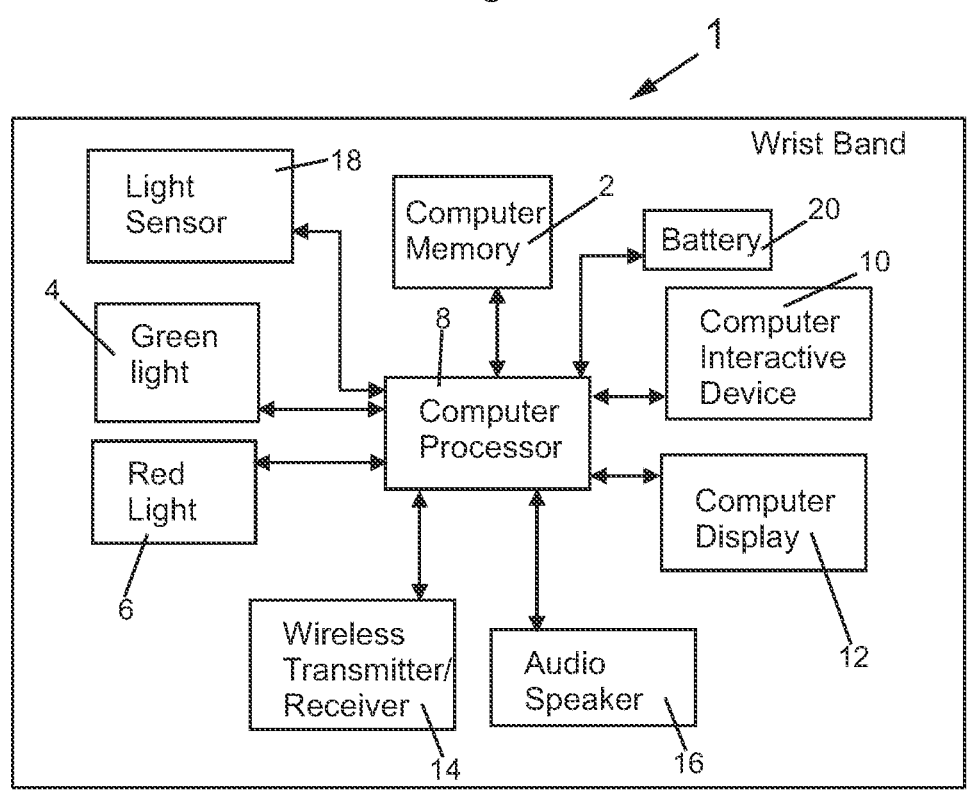
FIG. 1 shows a simplified block diagram of components for a wrist band to be worn by a person in accordance with an embodiment of the present invention.

FIG. 1 shows a simplified block diagram of components for a wrist band 1 to be worn by a person in accordance with an embodiment of the present invention.

The wrist band 1 may include a computer memory 2, green light 4, red light 6, computer processor 8, computer interactive device 10, computer display or monitor 12, wireless transmitter/receiver 14, audio speaker 16, light sensor 18, and a battery or charging device 20. The computer processor 8 is linked by communications lines, such as hardwired or wireless communications links to components 2, 4, 6, 10, 12, 14, 16, and 18. The computer interactive device 10 may include, for example, a touch screen computer display, a computer mouse, buttons, and/or a computer keyboard. The lights 4 and 6 may be LED lights.

Figure 2:
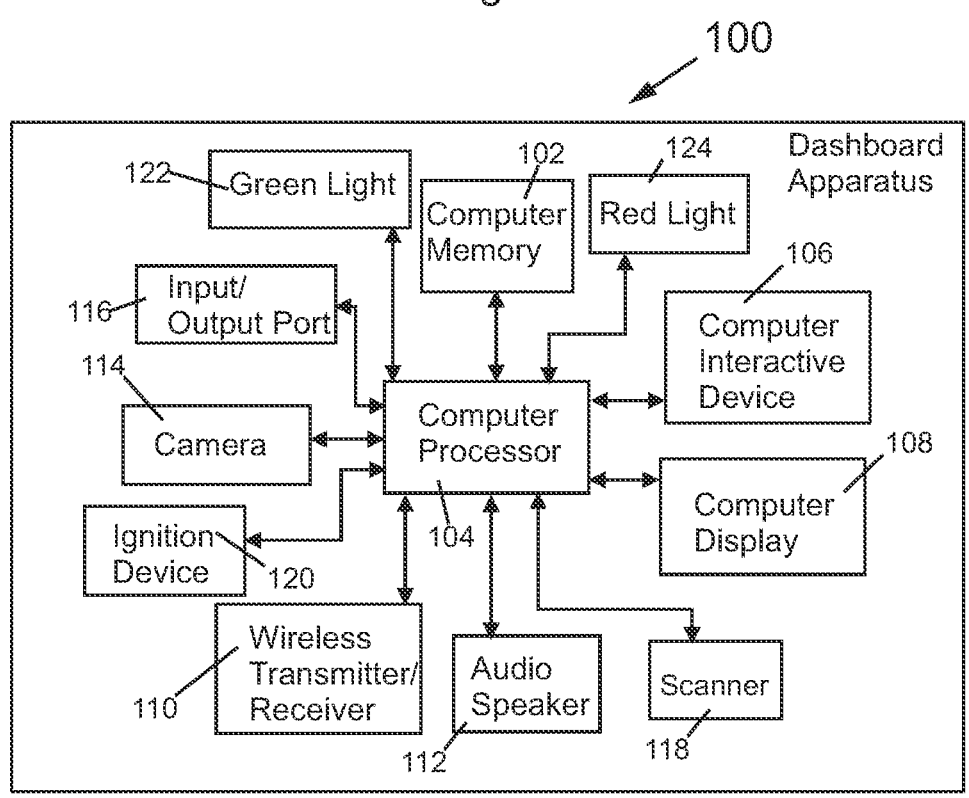
FIG. 2 shows a simplified block diagram of components for a dashboard apparatus of a vehicle, in accordance with an embodiment of the present invention.

FIG. 2 shows a simplified block diagram of components for a dashboard apparatus 100 of a vehicle, in accordance with an embodiment of the present invention.

The dashboard apparatus 100 may include a computer memory 102, computer processor 104, computer interactive device 16, computer display or monitor 108, wireless transmitter/receiver 110, an audio speaker 112, a camera 114, an input/output port 116, and a scanner 118. The computer processor 104 is linked by communications lines and/or links, such as hardwired or wireless communications links to components 102, 106, 108, 110, 112, 114, and 116. The computer interactive device 10 may include, for example, a touch screen computer display, a computer mouse, buttons, and/or a computer keyboard.

The camera 114 is configured, in at least one embodiment to be facing the street ahead or in front of a motor vehicle in which the dashboard apparatus 100 is located.

The dashboard apparatus 100 may also include one or more further sensors.

Prerecorded audio may be stored in computer memory 102; and may be played by computer processor 104 through audio speaker 112, during appropriate times. For example, the prerecorded audio may be played as soon as the dashboard apparatus 100 senses the presence of an electronic wrist band 1 of a pedestrian, cyclist and or motorcyclist, by use of for example, camera 114, input/output port 116, wireless transmitter/receiver 110, scanner 118, and/or computer interactive device 106 which provide signals to computer processor 104.

When the dashboard apparatus 100 senses the presence of wrist band 1, pre-recorded audio stored in the computer memory 102 of the apparatus 100 may be played by the computer processor 104 on the audio speaker, such as: "please watch out for the pedestrians, cyclists and or motorcyclists on the street corner and or crossing the street and drive very slowly to prevent any accident and be prepared to come to a full stop to prevent any accident", in accordance with computer programming stored in computer memory 102.

The computer processor 104 of the dashboard apparatus 100, in at least one embodiment, is configured to be remotely connected or linked, through the wireless transmitter/receiver 110 to a plurality of wrist bands, similar or identical to wrist band 1, shown in FIG. 1, through wireless transmitter/receiver 14 of wrist band 1 and similar or identical wireless transmitter/receivers of wrist bands similar or identical to wrist band 1.

Each wrist band, similar or identical to FIG. 1, may be worn by a single pedestrian, bicyclist and/or motorcyclist, such that there are a plurality of pedestrians, bicyclists, and motorcyclists wearing a plurality of corresponding wrist bands, identical or similar to wrist band 1 shown in FIG. 1. The computer processor 8 may cause the green light 4 of the wrist band 1 to be continuously lit green to alert or inform the wearer of the electronic wrist band 1 that the electronic wrist band 1 is functioning or working well or working the way it is designed to work and that this electronic wristband 1 is roadworthy. The computer processor 8 may cause the red light 6 to blink red on and off if the wristband 1 is not operated property and then would also cause the green light to go off and not be lit. Both the green light 4 and the red light 6 are preferably located or situated on top of the electronic wrist band 1. Whenever any of the components of the electronic wristband 1 malfunction or is not working the way it is designed to work, a blinking red light 6 on top of the electronic wristband 1 is activated to alert or warn the wearer that it is time to tune up the electronic wristband 1 is activated to alert or warn the wearer that it is time to tune up the electronic wrist band 1 or time to replace or change the electronic wrist band 1 to make it roadworthy again.

Each wrist band 1, or a wrist band similar or identical to wrist band 1, may have a computer program stored in computer memory 2, which is programmed to provide through execution by computer processor 8, an audio warning through audio speaker 16, to alert the corresponding pedestrian, bicyclist, or motorcyclist wearing the wrist band 1 of a vehicle approaching the particular pedestrian, bicyclist, or motorcyclist. The approaching vehicle audio warning is provided, in at least one embodiment by an oncoming vehicle's (such as an automobile's) headlights, which are sensed by light sensor 18, which provides a signal to computer processor 8, which causes audio speaker 16 to provide an audio warning to the wearer of the wrist band 1.

In at least one embodiment, for one or more functions of the dashboard apparatus 100 and related components to work, a vehicle operator must start the corresponding vehicle's engine and put his/her corresponding vehicle into drive, for example, similar to as shown in U.S. Pat. No. 7,880,601, patentee Okezie, which is incorporated by reference herein. Similar to as shown in U.S. Pat. No. 7,880,601, the dashboard apparatus 100 may require a user to have a digital driver's license mobile computer application on a mobile phone is order to start the vehicle and generally before getting on a road or highway. The computer interactive device 106, the input/output port 116, the wireless transitter/receiver 110 and/or the scanner 118, may include a device for sensing the digital driver's license; and the computer processor 104, in response to one or more signals from components 106, 116, 110, and/or 118, may allow the starting of a vehicle. The computer processor 104 may be electrically connected to an ignition device 120 of a vehicle for allowing starting or turning on of a engine or motor of a vehicle.

The scanner 118 of the apparatus 100 may be located on the particular vehicle's rear wind shield at the center of the vehicle's rear windshield. The scanner 118, in at least one embodiment is configured to scan for electronic wrist bands, such as wrist band 1, of pedestrians, cyclists and/or motorcyclists at the rear of a vehicle (such as an automobile) whenever the vehicle operator puts his/her vehicle in reverse and the scanner 118 provides signats to the computer processor 104 to alert the vehicle operator of any pedestrians, cyclists and/or motorcyclists behind the vehicle operator. The dashboard apparatus 100 is configured, in at least one embodiment to receive a signal or signals from input/output port 116 that the vehicle engine is on and the vehicle is in drive.

In addition, in at least one embodiment, if the vehicle, in which the dashboard apparatus 100 is idle and not in motion that vehicle will not be able to activate one or more functions of the dashboard apparatus 100. Computer processor 104 may detect that the vehicle in which apparatus 100 is located is idle and/or not in motion through one or more signals provided through input/output port 116 to the computer processor 104.

When functions of the dashboard apparatus 100 are fully activated and the vehicle in which dashboard apparatus 100 approaches an individual wearing the wrist band 1 or a similar or identical wrist band, an audio warning will be communicated from the apparatus 100 to the wrist band 1, implemented by computer processor 104 due to computer programming in computer memory 102, through wireless transmitter/receivers 110 and 14, and then implemented by computer processor 8 due to computer programming in computer memory 2, to provide an warning through audio speaker 16. This audio warning may be provided when the apparatus 100 is within a certain distance of the wrist band 1, such as within twenty feet. This audio warning may be a pre- recorded audio message stored in an audio file in computer memory 2, that "a vehicle is approaching, make sure you are not in harm's way" or words to that affect. This audio warning may be provided when the apparatus 100 is within a certain distance of the wrist band 1, such as within 0.5 blocks (half of a block) or within one hundred and sixty feet from the wrist band 1, wherein the wrist band 1 is being worn by for example, a pedestrian, cyclist and or motorcyclist This audio warning may be a pre recorded audio message stored in an audio file in computer memory 2, that "a vehicle is approaching, make sure you are not in harm's way" or words to that effect.

The wrist band 1 may include bluetooth communications capability for communicating with cell phones, such as implemented in one or more embodiments, through wireless transmitter/receiver 14, The computer memory 102 in the apparatus 100 and the computer memory 2 in the wrist band 1 may be programmed so that the audio speaker 112 of the apparatus 100 provides an audio message indicating that there is a pedestrian, cyclist, or motorcyclist nearby, and the audio speaker 16 simultaneously, or approximately simultaneously provides an audio message that a vehicle is approaching when the vehicle having apparatus 100 is within a certain distance, such as twenty half a block or within one hundred and sixty feet of the wrist band 1. The audio message provided through audio speaker 112 may be "please drive carefully and watch out for pedestrians and cyclists and try to share the roads" or words to that affect and this may be stored as an audio file on computer memory 102.

The dashboard apparatus 100, in at least one embodiment, may include a green light 122 and a red light 124, as shown in FIG. 2, which are in communication with the computer processor 104, such as hardwired electronically or through wireless communication. The green light sensor 122 and the red light sensor 124 are preferably configured in a vehicle so that both sensors 122 and 124 are facing the vehicle operator. The green light sensor or light emitting diode 122, may be configured to be constantly lit green, and the red light 124 is turned off if the dashboard apparatus 100 is functioning properly. However, when the dashboard apparatus 100 is not functioning properly, the computer processor 104 is programmed to cause the green light or LED 122 to turn off and to turn on the red light 124.

The dashboard apparatus 100, in at least one embodiment, is configured so that the forward facing camera 114 or cameras, are able to scan and/or see a pedestrian, cyclist, and/or motor cyclist, and/or the dashboard apparatus 100 is able to detect by communications between the wrist band 1 and the dashboard apparatus 100, through wireless transmitters/receivers 14 and 110, that a pedestrian, cyclist, and/or motor cyclist is within a certain distance of the dashboard apparatus 100; and both the apparatus 100 and the wrist band 1 are able to provide warnings.

The dashboard apparatus 100 is activated to alert a vehicle operator to watch out for pedestrians, cyclists and/or motorcyclists on a street corner or crossing a street, at the same time or simultaneously, as soon as for example the scanner 118 and/or the camera 114 detects or senses a wrist band 1 of a pedestrian, cyclist and/or motorcyclist.

In addition, a pre-recorded message may be activated by computer processor 8 and played through audio speaker 16, to alert the wristband 1 wearer by saying something like this to the wrist band 1 wearer through speaker 16: "please watch out for the approaching vehicle and please stay clearly out of the road of the approaching vehicle, and thanks for getting out of the road". Please note that every electronic wrist band 1, in at least one embodiment, is equipped with a red light or sensor 6. The red light or sensor 6 may blink on and off on the electronic wrist band 1 to alert the wrist band 1 wearer that it is time to replace or change the charging device and/or battery 20 (battery/ionic battery) on the electronic wrist band 1.

The audio message may be played when the dashboard apparatus 100 is within half a block or within one hundred and sixty feet of the wristband 1, when it is being worn by, for example, a pedestrian, a cyclist, or a motorcyclist. This distance should be reasonable enough to the wrist band wearer enough time to react or get out of the road of the oncoming vehicle. However, the distance between the dashboard apparatus 100 and the wristband 1, when the audio message is programmed to play, may also depend on the speed of the on coming or approaching vehicle to the wrist band 1 and the wearer of the wrist band 1.

In at least one embodiment, the wrist band 1, through computer programming stored in computer memory 2, implemented by computer processor 8, communicates with a cell phone, such as through transmitter/receiver 14, to provide a reminder on an individual's cell phone with an audio message stating for example "Please remember to take your road safety wrist band electronics with you" or words to that affect.

The present invention, in one or more embodiments, also helps to limit the damages and/or loss of life due to incidents where individuals may intentionally or unintentionally drive into a crowd of people. In at least one embodiment, whenever a vehicle having apparatus 100 gets too close to an individual wearing a wrist band 1 or a similar or identical wrist band 1, the computer processor 8 presumes that the apparatus 100 has either hit a pedestrian, cyclist, or motorcyclist or is about to, and the computer processor 104 acts through the input/output port 116, in accordance with computer programming stored in computer memory 102 to shut off the engine of the vehicle in which the apparatus 100 is located. This limits the damage, injuries, and/or deaths due to a vehicle driving into a crowd.

In at least one embodiment, when a vehicle drives into a crowd, the particular vehicle operator's digital driver's license may be automatically deactivated instantly as disclosed in U.S. Pat. No. 10,347, 107, which is incorporated by reference herein.

The camera 114, in at least one embodiment, is configured to be able to penetrate/see thru a powerful snow dust or whirlwind dust up to half a mile (0.5 miles ahead) and displays the road condition ahead on the computer display or monitor 108 and with audio messages through the audio speaker 112 to advise the vehicle operator such as "the weather condition ahead is very bad, please pull over to the shoulder of the road to see if the weather condition can improve before you can get back on the road again" or words to that effect.

The wristband 1 may have features to protect it from tampering or theft. To prevent theft, the wristband 1 may be equipped in at least one embodiment, with a "voice activation" device, which may be part of computer interactive device 10. Once activated, the electronic wrist band 1 is configured to work for a designated owner of the electronic wristband 1; and otherwise, it will not work if stolen or tampered with.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art

I claim:

1. An apparatus comprising:
   a first wrist band comprising:
      a computer processor;
      a computer memory;
      an audio speaker in communication with the computer processor of the first wrist band; and
      a wireless transmitter/receiver in communication with the computer processor of the first wrist band; and
   wherein the computer memory of the first wrist band includes computer programming for causing the computer processor of the first wrist band to cause an audio message to be played by the audio speaker of the first wrist band when a dashboard apparatus located on a vehicle approaches within a certain distance of the first wrist band;
   further comprising:
   the dashboard apparatus; and
   wherein the dashboard apparatus is comprised of:
      a computer processor;
      a computer memory;
      an audio speaker in communication with the computer processor of the dashboard apparatus; and
      a wireless transmitter/receiver in communication with the computer processor of the dashboard apparatus; and wherein the computer memory of the dashboard apparatus includes computer programming for causing the computer processor of the dashboard apparatus to cause an audio message to be played by the audio speaker of the dashboard apparatus when the first wrist band approaches within a predetermined range of the dashboard apparatus; and wherein the audio message to be played by the audio speaker of the dashboard apparatus when the first wrist band approaches within a predetermined range of the dashboard apparatus, is only played if an engine of the vehicle in which the dashboard apparatus is located is on and the vehicle in which the dashboard apparatus is located is in drive.

2. The apparatus of claim 1 wherein the dashboard apparatus includes a camera configured to face ahead of a motor vehicle in which the dashboard apparatus is located.

3. The apparatus of claim 2 wherein the camera is configured to be able to see a person in front of the motor vehicle in which the dashboard apparatus is located.

4. The apparatus of claim 1 further comprising
a plurality of wrist bands, which includes the first wrist band;
wherein the dashboard apparatus is configured to communicate with the plurality of wrist bands;
wherein each of the plurality of wrist bands comprises:
a computer processor;
a computer memory;
an audio speaker in communication with the computer processor of each of the plurality of wrist bands; and
a wireless transmitter/receiver in communication with the computer processor of each of the plurality of wrist bands; and
wherein the computer memory of each of the plurality of wrist bands includes computer programming for causing the computer processor of each of the plurality of wrist bands to cause an audio message to be played by the audio speaker of each of the plurality of wrist bands when the dashboard apparatus located on the vehicle approaches within a certain distance of each of the plurality of wrist bands.

5. The apparatus of claim 1 wherein
the first wrist band includes a light sensor which is configured to sense a headlight of an oncoming vehicle and in response to cause an audio message to be played by the audio speaker of the first wrist band.

6. The apparatus of claim 4 wherein
each of the plurality of wrist bands includes a light sensor which is configured to sense the headlights of an oncoming vehicle and in response to cause an audio message to be played by the audio speaker of each of the plurality of wrist bands.

7. The apparatus of claim 1 wherein
at least part of the dashboard apparatus is located on the rear windshield of the vehicle on which the dashboard apparatus is located; and
wherein the at least part of the dashboard apparatus located on the rear windshield senses whether there is a person behind the vehicle, and provides an alert to an operator of the vehicle on which the dashboard apparatus is located.

8. A method comprising the steps of:
placing at least part of a dashboard apparatus on a dashboard of a vehicle;
wherein the dashboard apparatus is comprised of:
a computer processor
a computer memory;
an audio speaker in communication with the computer processor of the dashboard apparatus; and
a wireless transmitter/receiver in communication with the computer processor of the dashboard apparatus; and
wherein the computer memory of the dashboard apparatus includes computer programming for causing the computer processor of the dashboard apparatus to cause a first audio message to be played by the audio speaker of the dashboard apparatus when a first wrist band approaches within a predetermined range of the dashboard apparatus; and
wherein the audio message to be played by the audio speaker of the dashboard apparatus when the first wrist band approaches within a predetermined range of the dashboard apparatus, is only played if an engine of the vehicle in which the dashboard apparatus is located is on and the vehicle in which the dashboard apparatus is located is in drive.

9. The method of claim 8 wherein
the dashboard apparatus includes a camera;
and the method further includes configuring the camera of the dashboard apparatus to face ahead of a motor vehicle in which the dashboard apparatus is located.

10. The method of claim 9 wherein
the camera is configured to be able to see a person in front of the motor vehicle in which the dashboard apparatus is located.

11. The method of claim 3 wherein
the computer memory of the dashboard apparatus includes computer programming for causing the computer processor of the dashboard apparatus to cause an audio message to be played by the audio speaker of the dashboard apparatus when any of a plurality of wrist bands, which include the first wrist band, approaches within a predetermined range of the dashboard apparatus.

12. The method of claim 8 further comprising:
configuring the first wrist band to have a light sensor which is configured to sense a headlight of an oncoming vehicle and in response to cause an audio message to be played by an audio speaker of the first wrist band.

13. The method of claim 11 further comprising
configuring each of the plurality of wrist bands to include a light sensor which is configured to sense a headlight of an oncoming vehicle and in response to cause an audio message to be played by an audio speaker of each of the plurality of wrist bands.

14. The method of claim 8 further comprising
placing at least part of the dashboard apparatus on a rear windshield of the vehicle; and
wherein the at least part of the dashboard apparatus located on the rear windshield senses whether there is a person behind the vehicle; and provides an alert to an operator of the vehicle on which the dashboard apparatus is located.

* * * * *